United States Patent
Moran et al.

(10) Patent No.: US 12,353,604 B2
(45) Date of Patent: Jul. 8, 2025

(54) DETECTING CLIENT ISOLATION ATTACKS IN FEDERATED LEARNING THROUGH OVERFITTING MONITORING

(71) Applicant: Dell Products L.P., Round Rock, TX (US)

(72) Inventors: Maira Beatriz Hernandez Moran, Rio de Janeiro (BR); Paulo Abelha Ferreira, Rio de Janeiro (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 364 days.

(21) Appl. No.: 17/937,842

(22) Filed: Oct. 4, 2022

(65) Prior Publication Data

US 2024/0111903 A1    Apr. 4, 2024

(51) Int. Cl.
*G06F 21/64* (2013.01)
*G06N 20/00* (2019.01)

(52) U.S. Cl.
CPC ............ *G06F 21/64* (2013.01); *G06N 20/00* (2019.01)

(58) Field of Classification Search
CPC ................................ G06F 21/64; G06N 20/00
See application file for complete search history.

(56) References Cited

U.S. PATENT DOCUMENTS

| | | | | |
|---|---|---|---|---|
| 10,719,301 B1* | 7/2020 | Dasgupta | ................ | G06F 8/34 |
| 11,556,746 B1* | 1/2023 | Dasgupta | ................ | G06N 5/04 |
| 11,848,828 B1* | 12/2023 | Talasila | ................ | H04L 41/16 |
| 11,948,297 B1* | 4/2024 | Cogan | ................ | A61B 6/502 |
| 12,086,053 B1* | 9/2024 | Cela Diaz | ........... | G06F 11/3692 |
| 2015/0193697 A1* | 7/2015 | Vasseur | ................ | G06N 3/02 706/12 |
| 2020/0005133 A1* | 1/2020 | Zhang | ................ | G06F 17/10 |
| 2020/0349047 A1* | 11/2020 | Faibish | ................ | G06N 3/08 |
| 2020/0364620 A1* | 11/2020 | Jordan | ................ | H04L 43/16 |
| 2021/0034947 A1* | 2/2021 | Wang | ................ | G11C 7/222 |

(Continued)

OTHER PUBLICATIONS

Velicheti, Raj Kiriti, Derek Xia, and Oluwasanmi Koyejo. "Secure Byzantine-Robust Distributed Learning via Clustering," arXiv preprint arXiv:2110.02940 (2021).

(Continued)

*Primary Examiner* — Jason Chiang
(74) *Attorney, Agent, or Firm* — Workman Nydegger

(57) ABSTRACT

One example method includes receiving at a client node of a federation a global machine-learning model that is to be trained by the client node using a training dataset that is local to the client node. In response to receiving the global machine-learning model, determining at the client node if the global machine-learning model is trending toward an overfitted state using a validation dataset. The overfitted state indicates that the global machine-learning model has not been received from a server that is part of the federation because of a client isolation attack. In response to determining that the global machine-learning model is trending towards the overfitting state, causing the client node to leave the federation. In response to determining that the global machine-learning model is not trending towards the overfitted state, training the global machine-learning model using the training dataset to thereby update the global machine-learning model.

16 Claims, 7 Drawing Sheets

(56) References Cited

U.S. PATENT DOCUMENTS

| | | | | |
|---|---|---|---|---|
| 2021/0064760 | A1* | 3/2021 | Sharma | G06F 21/577 |
| 2021/0248420 | A1* | 8/2021 | Zhong | G06V 10/82 |
| 2021/0303695 | A1* | 9/2021 | Grosse | G06N 3/08 |
| 2021/0357508 | A1* | 11/2021 | Elovici | G06F 11/3684 |
| 2021/0398017 | A1* | 12/2021 | Garg | H04L 9/50 |
| 2022/0075605 | A1* | 3/2022 | Iyer | G06N 3/084 |
| 2022/0292387 | A1* | 9/2022 | Zhou | G06N 3/098 |
| 2022/0343219 | A1* | 10/2022 | Takasaki | G06N 20/00 |
| 2023/0087863 | A1* | 3/2023 | Gong | G06F 18/24133 |
| 2023/0106985 | A1* | 4/2023 | Hu | G06N 3/045 |
| | | | | 706/25 |
| 2023/0153633 | A1* | 5/2023 | Mohalik | G06N 20/00 |
| | | | | 706/25 |
| 2023/0177378 | A1* | 6/2023 | Hassan | G06N 20/00 |
| | | | | 706/12 |
| 2023/0237311 | A1* | 7/2023 | Taghia | G06N 3/045 |
| | | | | 706/15 |
| 2023/0274004 | A1* | 8/2023 | Kanani | G06F 21/6245 |
| | | | | 726/26 |
| 2023/0334319 | A1* | 10/2023 | Ferreira | G06F 17/18 |
| 2023/0351049 | A1* | 11/2023 | Annau | G06F 21/64 |
| 2023/0419172 | A1* | 12/2023 | Ickin | G06N 20/20 |
| 2024/0006080 | A1* | 1/2024 | Molero Leon | G16B 20/40 |
| 2024/0012942 | A1* | 1/2024 | Zhou | G06N 20/00 |
| 2024/0037234 | A1* | 2/2024 | Fraboni | G06N 3/045 |
| 2024/0054391 | A1* | 2/2024 | Guha Thakurta | G06N 3/063 |
| 2024/0086700 | A1* | 3/2024 | Kim | G06N 3/084 |
| 2024/0104438 | A1* | 3/2024 | Sesha | G06N 20/20 |
| 2024/0119340 | A1* | 4/2024 | Ferreira | G06N 20/00 |
| 2024/0127114 | A1* | 4/2024 | Reyes | G06N 3/08 |
| 2024/0256973 | A1* | 8/2024 | Vandikas | G06N 20/00 |
| 2024/0362501 | A1* | 10/2024 | Nascimento da Silva | |
| | | | | G06N 5/022 |
| 2024/0382288 | A1* | 11/2024 | Jaisson | G16H 20/40 |

OTHER PUBLICATIONS

Blanco-Justicia, Alberto, Domingo-Ferrer, Joseph, Martínez, Sergio, Sánchez, David, Flanagan, Adrian, and Tan, Kuan Eeik. "Achieving Security and Privacy in Federated Learning Systems: Survey, Research Challenges and Future Directions," Engineering Applications of Artificial Intelligence 106 (2021): 104468.

Rodríguez-Barroso, Nuria, et al. "Survey on Federated Learning Threats: concepts, taxonomy on attacks and defences, experimental study and challenges," arXiv preprint arXiv:2201.08135 (2022).

Yeom, Samuel, et al. "Privacy Risk in Machine Learning: Analyzing the Connection to Overfitting," 2018 IEEE 31st Computer Security Foundations Symposium (CSF). IEEE, 2018.

McMahan, H. B., et al. "Federated Learning of Deep Networks using Model Averaging," CoRR abs/1602.05629, arXiv preprint arXiv:1602.05629 (2016).

* cited by examiner

DETECTING CLIENT ISOLATION ATTACKS IN FEDERATED LEARNING THROUGH OVERFITTING MONITORING

FIELD OF THE INVENTION

Embodiments of the present invention generally relate to federated learning processes. More particularly, at least some embodiments of the invention relate to systems, hardware, software, computer-readable media, and methods for a client node to use overfitting analysis to determine it has been subjected to a client isolation attack.

BACKGROUND

Federated Learning (FL) consists of a distributed framework for Machine Learning in which a global model is trained jointly by several nodes without ever sharing their local data. FL is an essential area for companies interested in providing infrastructure for private distributed Machine Learning (e.g., massive deployment of ML models to the edge where data must be kept local due to compliance, cost, or strategic reasons).

FL implements strong privacy guarantees. However, it suffers from specific security issues not necessarily present in other Machine Learning scenarios. One of the most efficient privacy attacks is client isolation. The main idea behind this type of attack is that inferring data of a target client from a global model that was aggregated is very difficult, since the model was updated using data from different clients, not only from the target client. In this way, this attack aims to maximize the influence of updates on the target client. For that, the client is isolated, i.e., prevented from accessing the global model, which is updated using an aggregation of the updates of other clients.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1A:
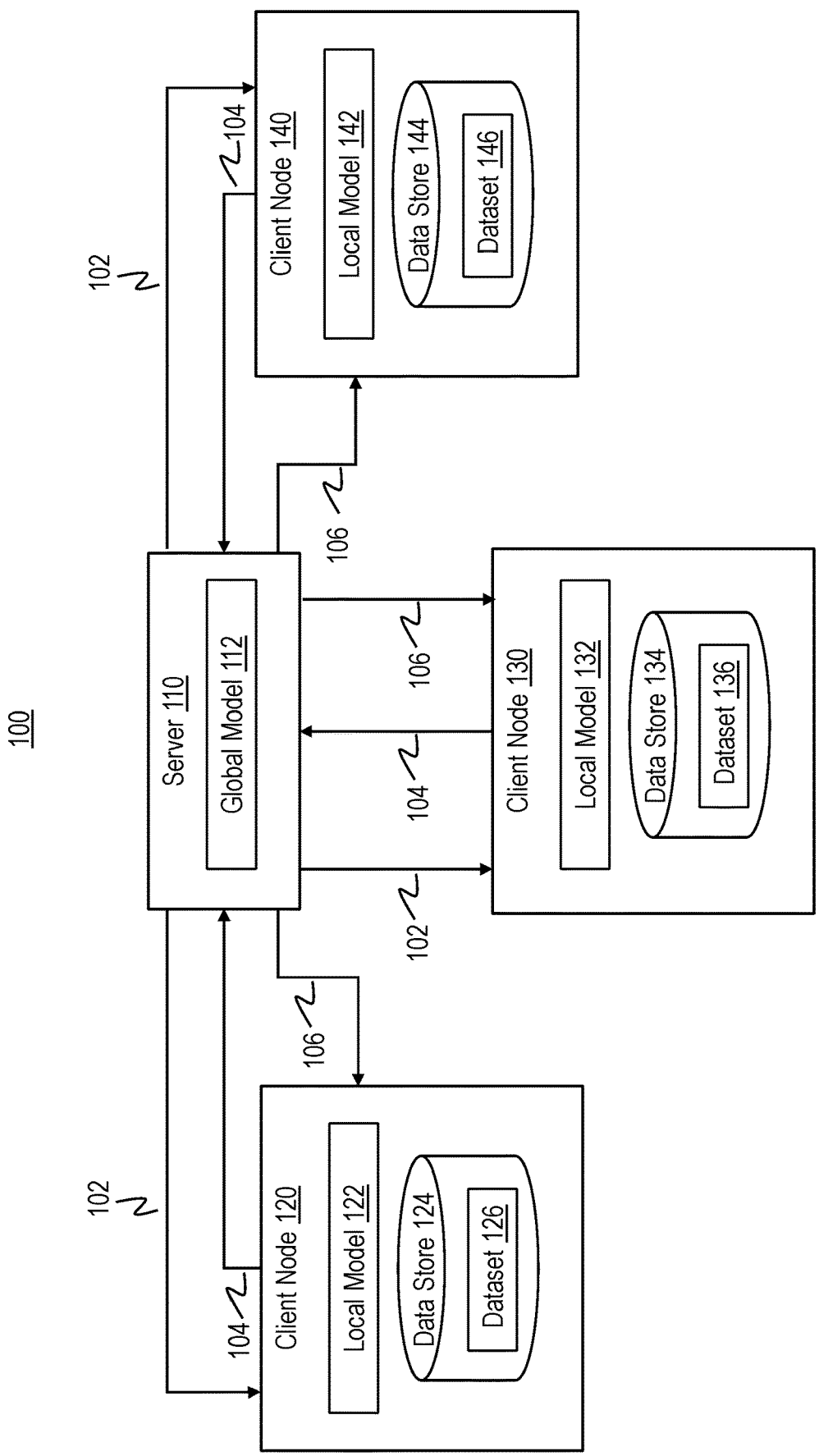
FIG. 1A illustrates an embodiment of a Federated Learning (FL) setting.

Embodiments of the present invention generally relate to federated learning processes. More particularly, at least some embodiments of the invention relate to systems, hardware, software, computer-readable media, and methods for a client node to use overfitting analysis to determine it has been subjected to a client isolation attack.

In general, example embodiments of the invention are directed towards detecting a client isolation attack at a client node. One example method includes receiving at a client node of a federation a global machine-learning model that is to be trained by the client node using a training dataset that is local to the client node. In response to receiving the global machine-learning model, determining at the client node if the global machine-learning model is trending toward an overfitted state using a validation dataset. The overfitted state indicates that the global machine-learning model has not been received from a server that is part of the federation because of a client isolation attack. In response to determining that the global machine-learning model is trending towards the overfitting state, causing the client node to leave the federation. In response to determining that the global machine-learning model is not trending towards the overfitted state, training the global machine-learning model using the training dataset to thereby update the global machine-learning model.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a way is provided for a client node in a Federated Learning setting to detect if it has been subjected to a client isolation attack. In existing systems, there is no way for a client node to detect a client isolation attack. The client node must simply trust that it is receiving a global model from the federation server for updates and that the updated model it generates is being provided to the federation server. Thus, the embodiments of the invention disclosed herein provide enhanced privacy and security as the client node is able to leave the federation when it detects the client isolation attack. This in turn ensures that the privacy of the data stored on the client node is maintained and better protected from malicious parties.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Federated Learning (FL) consists of a distributed framework for Machine-Learning (ML) in which a global model is trained jointly by several nodes without ever sharing their local data. FL is an essential area for companies interested in providing infrastructure for private distributed machine-learning (e.g., massive deployment of ML models to the edge where data must be kept local due to compliance, cost, or strategic reasons).

FL implements strong privacy guarantees. However, it suffers from specific security issues not necessarily present in other ML scenarios. For instance, it is known that the distributed nature, architectural design, and data constraints of federated learning open up new failure modes and attack surfaces. Several of these attacks aim to compromise the privacy of clients.

Standard horizontal FL settings are composed of client nodes, which are configured to perform local training using their own private data and maintain local models, and a server, which is configured to unify the local models in a unique global model based on client nodes' updates, in a step called aggregation. This process is performed iteratively for several rounds. Note that this approach ensures that the private data is not directly handled by the server. Nevertheless, even the intermediate information shared in this aggregation process can be used in different attacks to reveal the client node's private data. Client isolation is one of the most effective privacy attacks, especially when combined with other attacks. This kind of attack's basic premise is that inferring client-specific data from updates obtained after local training of an aggregated global model is highly challenging since the global model was updated using information from numerous clients, not just the target client. In other words, the local training performed might not be enough to obtain client data from the update. In this way, the client isolation attack seeks to increase the private data influence on updates of the target client. In order to accomplish this, the client is isolated, which prevents it from accessing the global model for several global rounds. As a result, the target client's model contains a lot more information about its own data, making it simpler to infer that data.

Recent FL settings have implemented sophisticated mechanisms to promote security and privacy defenses that have been demonstrated to be efficient for a wide range of attacks, such as Byzantine and poisoning. Nevertheless, these defenses do not offer additional protection against client isolation attacks. This is partly because FL typically suffers from two unique challenges: (1) client nodes in general FL settings do not perform any verification that allows them to detect that they are being victims of an isolation attack, and (2) isolated clients can have their data inferred more easily by combining isolation with other inference attacks.

B. Context

In general, some embodiments are directed to resolving one or more challenges posed by client isolation attacks in Federated Learning (FL). Following is contextual information for some example embodiments.

B.1 Federated Learning

As shown in FIG. 1A, in a normal FL setting 100, a server 110 (i.e., a central node) provides an initial global model 112 to a client node 120, a client node 130, and a client node 140 as shown at 102. The client node 120 includes a local model 122 and a local data store 124 that stores a local dataset 126. The client node 130 includes a local model 132 and a local data store 134 that stores a local dataset 136. The client node 140 includes a local model 142 and a local store 144 that stores a local dataset 146. The global model 112 and the local models 122, 132, and 144 may be any reasonable ML model such as, but not limited to, deep neural networks, convolutional neural networks, multilayer neural networks, recursive neural networks, logistic regressions, isolation forests, k-nearest neighbors, support vector machines (SVM), or any other reasonable machine-learning model. It will be understood that the local models are local versions of the global model that is provided to the client nodes by the server during an initial cycle.

The client node 120 performs local training on the local model 122 using the local dataset 126. Likewise, the client node 130 performs local training on the local model 132 using the local dataset 136. In similar manner, the client node 140 performs local training on the local model 142 using the local dataset 146.

As a result of the local training, the local models 122, 132, and 142 are updated to fit the local datasets 126, 136, and 146 respectively to the global model 212. As shown at 104, the updated local models 122, 132, and 142 are sent by the client nodes to the server 110, which aggregates the updates of all client nodes to obtain an updated global model 112. This new updated global model 112 is then sent back to the client nodes 120, 130, and 140 as shown at 106 and become the local models 122, 132, and 142. This cycle is repeated iteratively for a user determined amount of update rounds. It will be noted that after each cycle, each of the client nodes have a local model (i.e., local models 122, 132, and 142) that not only fits each client nodes local datasets (i.e., local datasets 126, 136, and 146), but that also fits the local datasets of the other client nodes, resulting in a local model with a good generalization.

B.2 Client Isolation Attacks in Federated Learning

Client isolation attacks aim to prevent a client node, such as the client nodes 120, 130, and/or 140, from accessing the global model 112 updates so that the client nodes local models 122, 132, and/or 142 would retain more information about the local datasets 126, 136, and/or 146. The main idea of isolating a given client node is creating a local view of the federation. In this way, the local model of the isolated client node is not aggregated with the parameters of the other client nodes in the federation, so that more information about the local dataset is stored in the isolated model. This additional information about the local dataset that is stored in the isolated model can then be used to infer the local dataset, which is turn may allow a malicious party to learn private information about the entity that controls the isolated model.

Figure 1B:
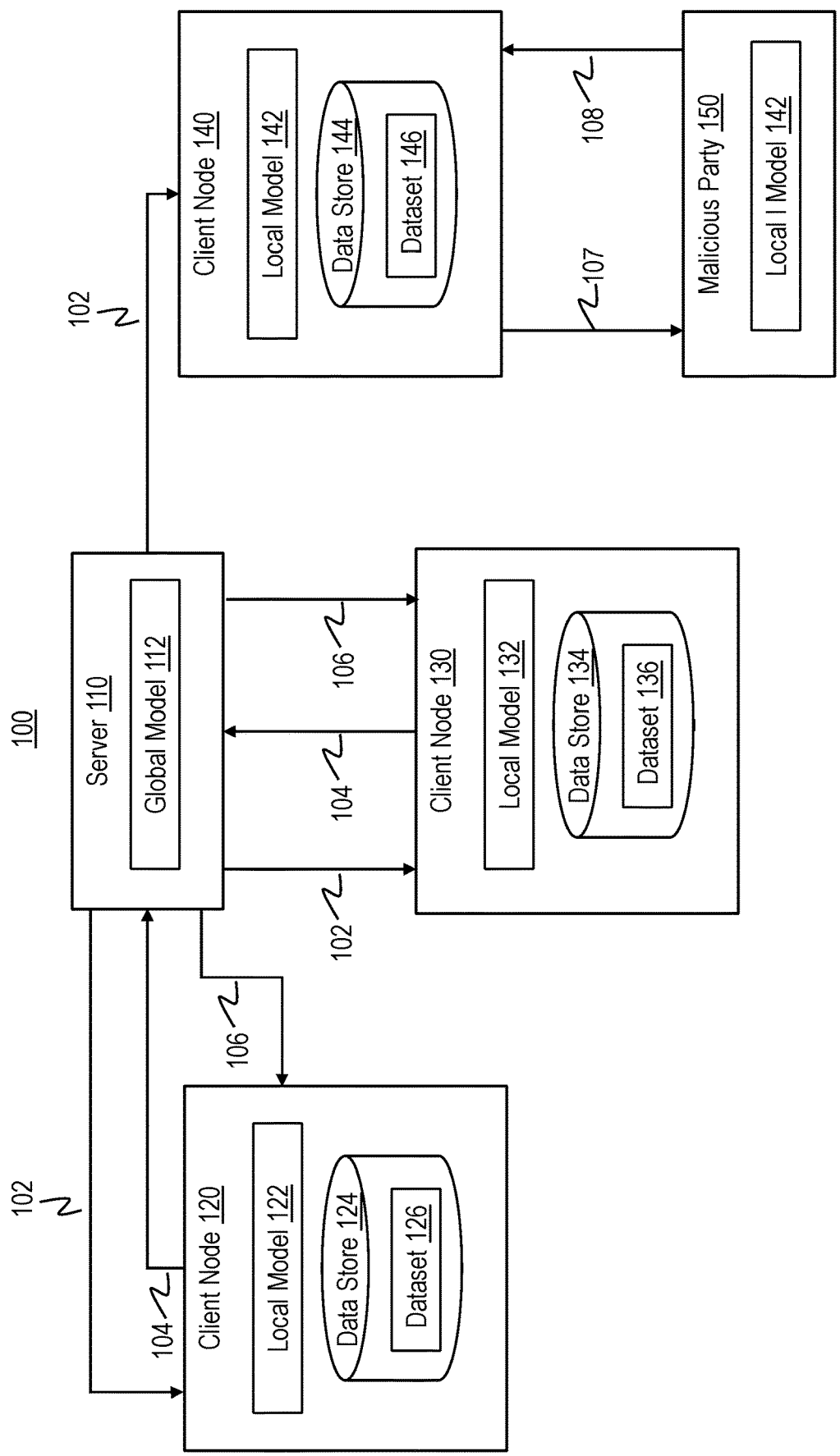
FIG. 1B illustrates an embodiment of a client isolation attack on the FL setting of FIG. 1A.

FIG. 1B shows an isolation attack on the FL setting 100 of FIG. 1A. In FIG. 1B, the server 110 provides the initial global model 112 to the client node 120, the client node 130, and the client node 140 as shown at 102 in the manner previously described in relation to FIG. 1A. However, as shown in FIG. 1B, a malicious party 150 intercepts the process flow between the server 110 and the client node 140 and assumes the role of the server 110 for the client node 140. Thus, after the client node 140 has performed the local training on the local model 142 using the local dataset 146, the client node 140 sends, as shown at 107, the updated local model 142 to the malicious party 150 instead of the server 110. The malicious party 150 then sends back to the client node 140 the client node's own local model 142 as shown at 108 and passes this off as the updated global model. However, this model only contains the updates based on the local dataset 146, and does not contain the updates based on the local datasets of the client nodes 120 and 130. In response, the client node 140 will update the model received from the malicious party.

This cycle may continue iteratively for as long as the malicious party 150 continues to return the updated local model 142 to the client node 140 as the updated global model. Note that the client node 140 always keeps updating the local model 142 that only considers the local dataset 146, which leads to an accentuation of the local dataset 146 influence in the local model 142, increasing generalization error and resulting in an overfitting of local model 142 to the local dataset 146.

After achieving an overfitted local model 142 through the isolation attack on the client node 140, the malicious party 150 can perform other inference attacks to infer the local dataset 146. Examples of possible post-isolation inference attacks include, but are not limited to, applying a gradient ascent technique to infer the local dataset 146 from the local model 142 or implementing classification models to determine if a record was part of the local dataset 146. It known that there is an increase in the success rate of other inference attacks, such as gradient ascent, when combined with client node isolation. Moreover, the generalization behavior of a model is a strong predictor of vulnerability to inference attacks. In other words, inference attack success and generalization error are closely related in most common learning settings.

C. Aspects of Some Example Embodiments

The example embodiments disclosed herein are directed toward a protocol that addresses the particular privacy challenges of FL, namely that (1) client nodes in general FL settings do not perform any verification that allows them to detect that they are being victims of an isolation attack, and (2) isolated clients can have their data inferred more easily by combining isolation with other inference attacks. The protocol advantageously includes a verification step in a client node's local processing during FL training which indicates the occurrence of an isolation attack as will be described in more detail to follow.

In the protocol, a first step is performed when a client node joins the federation, before the first local training. Firstly, the client node carries out a dataset split of the local data stored at the client node, defining a validation dataset that is not to be used for local training of the local model and a training dataset that is used in the training of the local model. After that, the client node starts handling the initial global model received from the server. Then, the client node proceeds to the regular local training, using the training dataset previously defined, and sends the updates to the server. In the next rounds, the client nodes checks if the global model, supposedly informed by the server, is trending towards an overfitted state. For this verification, the client uses the validation dataset initially defined to detect overfitting trends. If the updated global model is trending towards an overfitted state, the client node can leave the federation by interrupting communication with the server, in order to prevent other malicious actions that the client isolation attacker may carry out to infer private data in the locate dataset.

Figure 2:
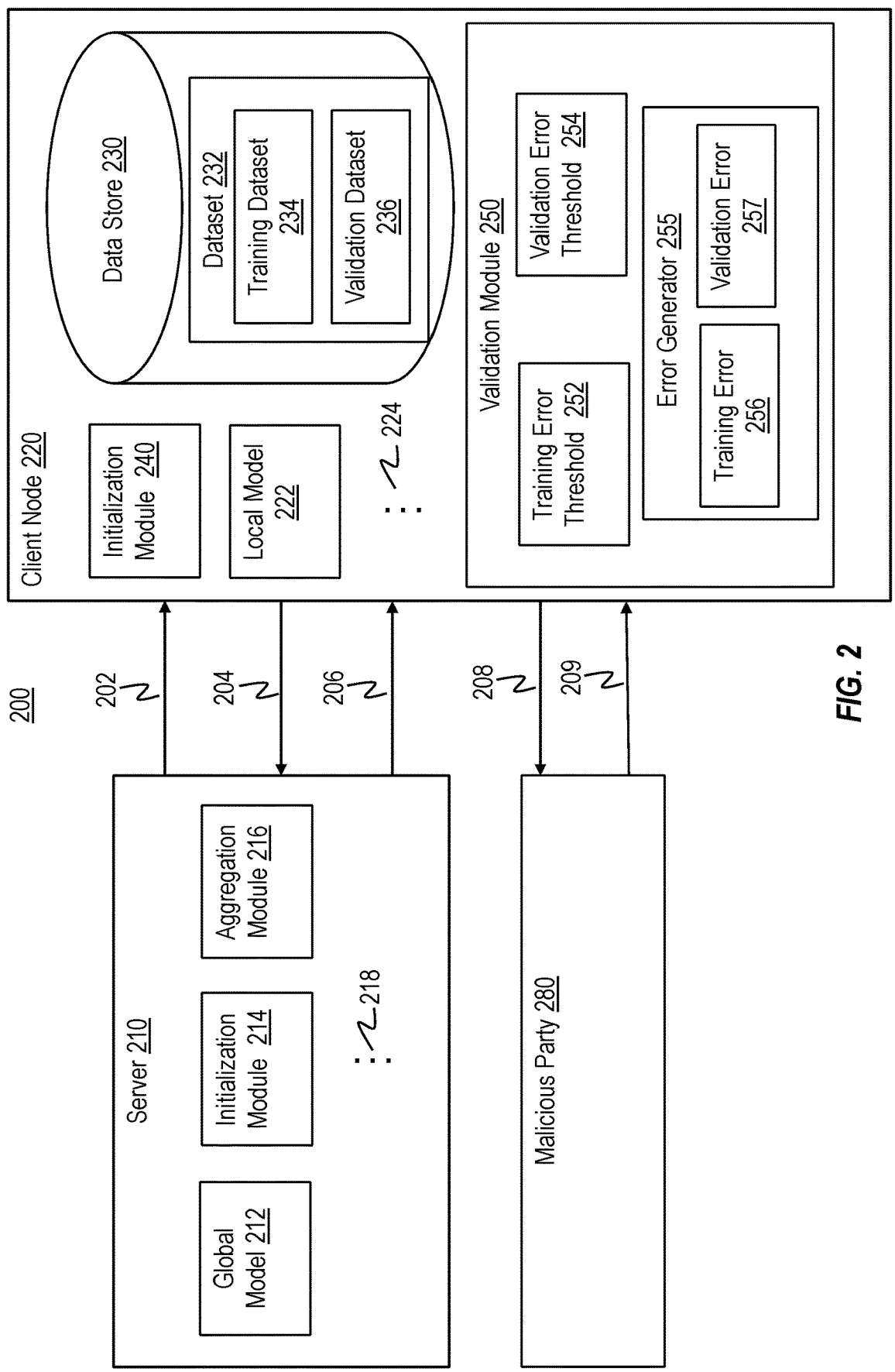
FIG. 2 discloses an embodiment of an FL setting that performs a protocol to detect a client isolation attack.

FIG. 2 illustrates an embodiment of a FL setting 200 that is able to perform the protocol disclosed herein. As illustrated, the FL setting 200 includes a server 210, which may correspond to the server 110 previously described. The server 210 includes a global model 212, which may correspond to the global model 112 previously described, an initialization module 214, and an aggregation module 216. The ellipses 218 represent that the server 210 may include additional modules and functionality.

The FL setting 200 also includes a client node 220, which may correspond to any of the client nodes 120, 130, and 140 previously described. The client node also includes a local data store 230 that includes a local dataset 232. The client node further includes an initialization module 240 and a validation module 250. The ellipses 224 represent that the client node 220 may include additional modules and functionality. Although not illustrated for ease of explanation, the FL setting 200 also includes any number of additional client nodes that may correspond to any of the client nodes 120, 130, and 140 and that may have a similar configuration as the client node 220 and communicate with the server in a similar manner as the client node 220.

When the client node 220 joins the federation, the initialization module 240 carries out a data spilt of the local dataset 232. Specifically, the initialization module 240 splits the local dataset 232 into a training dataset 234 and a validation dataset 236.

The initialization module 214 of the server 210 initializes the global model 212 and selects the client nodes that are to join in the current round of model training and use. In FIG. 2, the client node 220 is selected for the current round. As shown at 202, the server 210 sends the initial global model 212 to the client node 220 and the other nodes of the federation selected for the current round. The client node 220 receives a local model 222, which may correspond to one of the local models 122, 132, and 142 previously described, and is the local version of the global model 212.

During the initial round, the local model 222 is modified to fit the training dataset 234. As shown at 204, the client node 220 sends the updated local model 222 to what it believes to be the server 210. In the case that the client node 220 has not been subjected to a client isolation attack by a malicious party 280, the server 210 will receive the updated global model. The aggregation module 216 of the server 210 will then aggregate the updated local model 222 with the updated local models received from the other client nodes in the federation and will generate an updated global model 212. As shown at 206, the updated global model 212, which has been fitted to all the local data of the client nodes, is again provided to the client node 220 as an updated local model 222.

In this case, however, the client node 220 cannot be certain if the updated global model has been received from the server or if the client node has been subjected to an isolation attack from the malicious party 280. Accordingly, the validation module 250 performs a validation process to determine if the updated global model 212 is in an overfitted state or at least showing an overfitting trend. During the validation process, the validation module 250 fits the validation dataset 236 to the updated global model 212 and analyzes the results to determine if the updated global model is in the overfitted state or at least showing an overfitting trend. It will be noted that the validation dataset 236 is never used as part of the training dataset 234 to ensure that the validation process can properly determine if the updated global model 212 is in an overfitted state or showing an overfitting trend.

It will also be noted that the validation module may perform any number of different processes that use the validation dataset when performing the validation process. In other words, the validation dataset is used as an input into a validation process that is designed to output a result indicating the overfitted state. Accordingly, the embodiments and claims disclosed herein are not limited by the particular way that the validation process is performed to determine if updated global model is in an overfitted state or showing an overfitting trend.

In FIG. 2, as shown at 206, it is the actual server 210 that sent the updated global model 212 to the client node 220. Thus, the validation module 250 should infer that the updated global model 212 is not in an overfitted state or trending to overfitting. In response, the client node updates the local model 222 using the training dataset 234 and provides the updated local model to the server 210. Upon receipt of an updated global model 212 during a subsequent cycle, the validation module will again use the validation dataset 236 during the validation process. The validation process of having the validation module 250 fit the validation dataset 236 to the updated global model 212 will occur for each cycle that the client node 220 receives an updated global model. In this way, the client node 220 can continuously determine if it has been subjected to a client isolation attack.

However, as shown at 208, during one cycle the malicious party 280 subjects the client node 220 to an isolation attack by intercepting the updated local model 222 that was being sent to the server 210. As shown at 209, the malicious party 280 returns the local model 222 as the updated global model 212 to the client node 220 for further local modeling. In this case, when the validation module 250 performs the validation process by fitting the validation dataset 236 to the purported global model 212 received from the malicious party 280, the validation module 250 should determine that the global model 212 is in an overfit state or trending to overfitting. When such determination is made, the client node 220 can leave the federation by interrupting all communication with the server 210, which will also interrupt all communication with the malicious party 280 since the malicious party 280 is acting as the server 210. In other words, the client node 220 interrupts communication with the server 210 and/or the malicious party 280. In this way, the malicious party 280 is unable to obtain any more insight into the local dataset 232, which should prevent or at least significantly hinder the other malicious actions that the malicious party 280 may carry out to infer private data in the local dataset 232.

In some embodiments, the validation module 250 includes or otherwise has access to a training error threshold 252 and a validation error threshold 254. The validation module further includes an error generator 255. In operation, the error generator 255 determines a training error 256 that specifies how well the training dataset 234 is fit to the most recently received global model 212, which includes an actual updated global model received from the server 210 or a purported updated global model received from the malicious party 280. If the training error 256 is below the training error threshold 252, then the validation module 250 determines that the most recently received global model 212 is performing good in training using the training dataset 234, that is performing as expected. However, if the training error 256 is above the training error threshold 252, then the validation module 250 determines that the most recently received global model 212 is performing badly in training using the training dataset 234, that is performing worse than expected.

Likewise, the error generator 255 determines a validation error 257 that specifies how well the validation dataset 236 is fit to the most recently received global model 212. If the validation error 257 is below the validation error threshold 254, then the validation module 250 determines that the most recently received global model 212 is performing good in training using the validation dataset, that is performing as expected. However, if the validation error 257 is above the validation error threshold 254, then the validation module 250 determines that the most recently received global model 212 is performing badly in training using the validation dataset 236, that is performing worse than expected.

Figure 3:
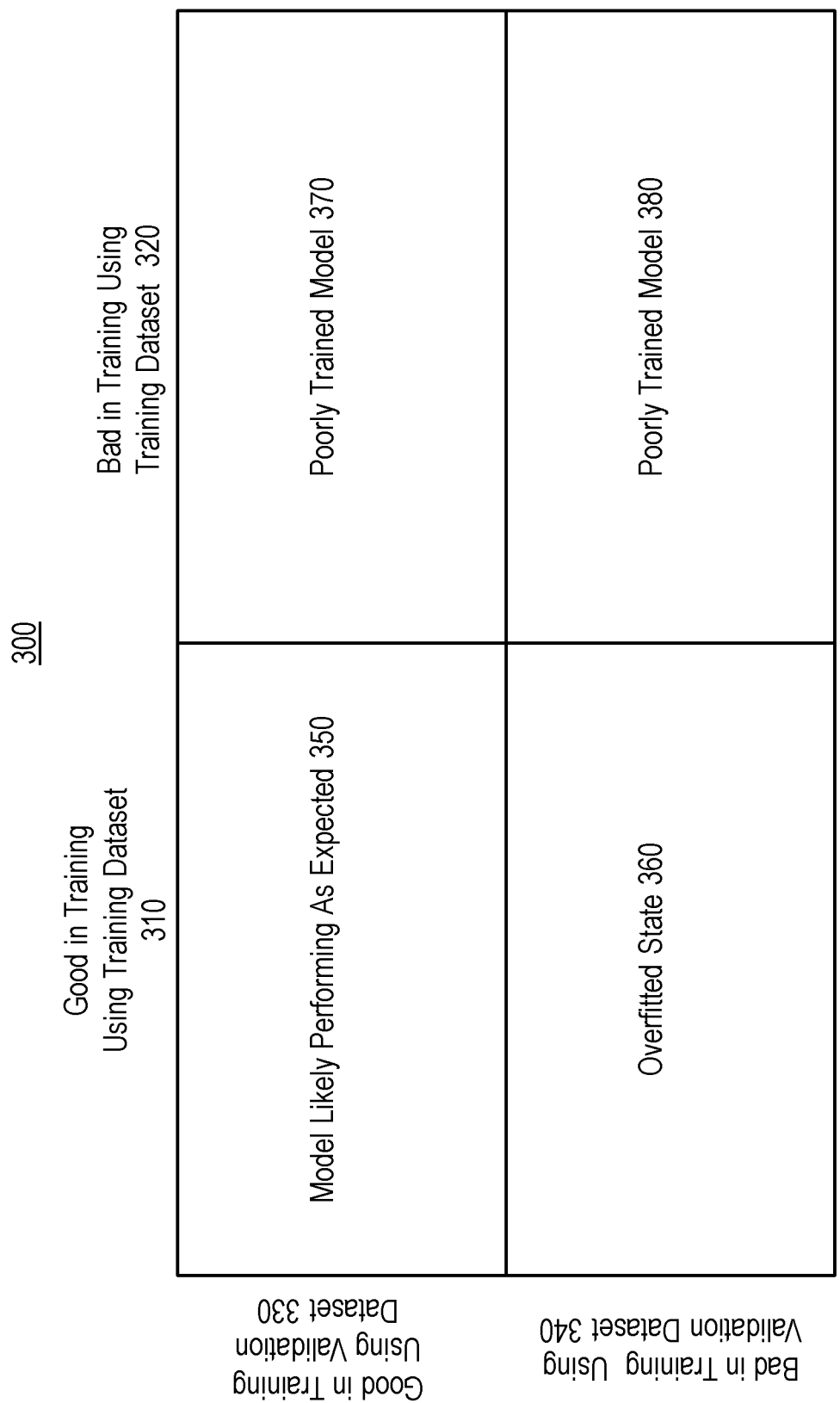
FIG. 3 illustrates an example confusion matrix.

FIG. 3 illustrates a confusion matrix 300 of the possible outcomes for the validation module after it used the training error 256 and the validation error 257 to determine the performance of the most recently received global model 212 in using the training dataset 234 and the validation dataset 236. As illustrated, the confusion matrix 300 includes two columns and two rows. The first row 310 represents when the local model 222 is good in training using the training dataset 234, that is when the training error 256 is below the training error threshold 252. The second row 320 represents when the local model 222 is bad in training using the training dataset 234, that is when the training error 256 is above the training error threshold 252. The first column 330 represents when the local model 222 is good in training using the validation dataset 236, that is when the validation error 257 is below the validation error threshold 254. The second column 340 represents when the local model 222 is bad in training using the validation dataset 236, that is when the validation error 257 is above the validation error threshold 254.

As shown in the top-left block 350, when the most recently received global model 212 performs good in training when using both the training dataset 234 and the validation dataset 236, this means that the most recently received global model 212 is likely performing as expected. That is, since the most recently received global model 212 has also considered the local datasets of the other client nodes in the federation, it should perform good when training the validation dataset 236 since it will not generalize towards the training dataset 234. Thus, this is the desired outcome.

As shown in the bottom-left block 360, when the most recently received global model 212 performs badly in training when using the training dataset 234, but performs good in training when using the validation dataset 236, this means that the most recently received global model 212 is in an overfitted state or at least trending to overfitting. That is, since the most recently received global model 212, which is this case would be a purported global model received from the malicious party 280, has not also considered the local datasets of the other client nodes in the federation, it should perform badly when training the validation dataset 236, but perform good when using the training dataset 234 since it will generalize towards the training dataset 234. In this case, the client node 220 can leave the federation by interrupting communication with the server 210 and the malicious party 280 as previously described.

The top-right block 370 and the bottom-right block 380 both show that when the most recently received global model 212 performs badly in training when using the training dataset 234, this typically means that the model has been poorly trained, regardless of the performance when using the validation dataset 236. In such cases, adjustments may need to be made to the training process. Thus, neither of these outcomes is desired, although they do not show any client isolation attack.

D. Example Methods

Figure 4:
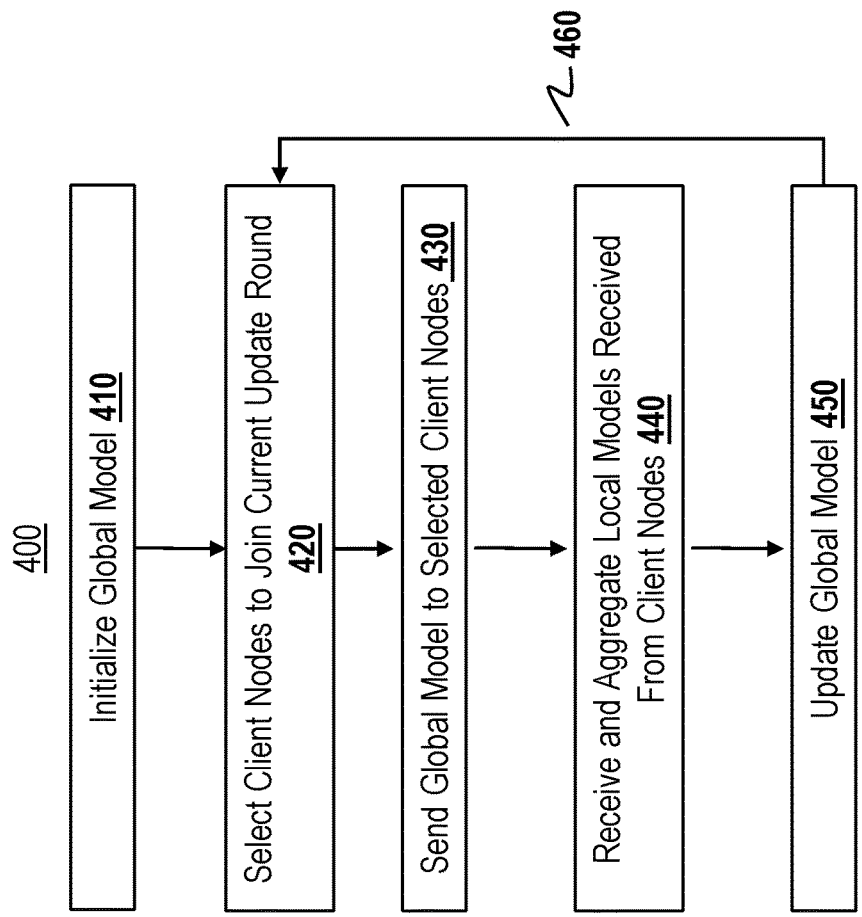
FIG. 4 illustrates a flowchart of an example method for a server to update a global machine-learning model.
Figure 5:
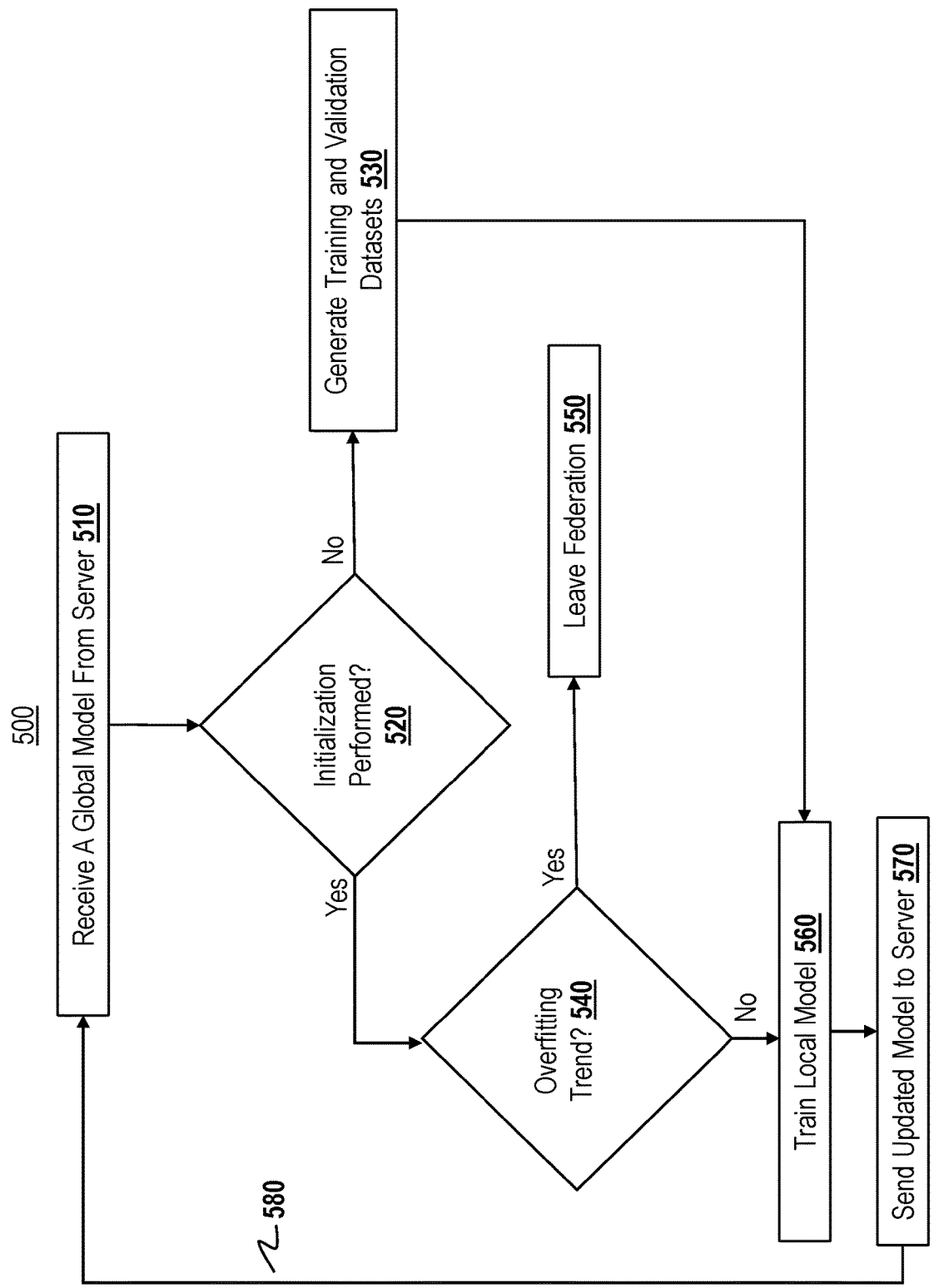
FIG. 5 illustrates a flowchart of an example method for a client node to determine if it has been subjected to a client isolation attack by determining if a received global machine-learning model is in an overfitted state or trending towards overfitting.

It is noted with respect to the disclosed methods, including the example method of FIGS. 4 and 5, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, an example method 400 for a server to update a global machine-learning model according to some embodiments is disclosed. The method 400 will be discussed with reference to FIG. 2 previously described, although the method 400 is not limited to the embodiment of FIG. 2.

The method 400 includes initializing a global machine-learning model 410. For example, initialization module 214 of the server 210 may initialize the global model 212.

The method 400 includes selecting client nodes of the federation to join a current update round 420. For example, the initialization module 214 of the server 210 may select the client node 220 and other client nodes to be part of the current update round.

The method 400 includes sending the global machine-learning model 212 to the selected client nodes 430. For example, the server 210 may send the global model 212 to the client node 220 and to the other selected client nodes.

The method 400 includes receiving and aggregating local machine-learning models received from the client nodes 440. For example, the aggregation module 216 of the server 210 may aggregate the local model 222 received from the client node 220 with the local models received from the other selected nodes of the federation.

The method 400 includes updating the global machine-learning model 450. For example, the server 210 may update the global model 212. The method steps 410-450 may be repeated for any number of additional update rounds as needed as shown at 460.

Directing attention now to FIG. 5, an example method 500 for a client node to determine if it has been subjected to a client isolation attack by determining if a received global machine-learning model is in an overfitted state or trending towards overfitting according to some embodiments is disclosed. The method 500 will be discussed with reference to FIG. 2 previously described, although the method 500 is not limited to the embodiment of FIG. 2.

The method 500 includes receiving a global machine-learning model from a server 510. For example, the client node 220 may receive the global model 212 from the server 210.

At a decision block 520, the method 500 determines if an initialization of the dataset that is local to the client node has been performed. If the answer is no, which may occur during the initial then update round, training and validation datasets are generated 530. For example, the initialization module 240 splits the local dataset 232 to generate the training dataset 234 and the validation dataset 236. Thus, the training dataset 234 and the validation dataset 236 are subsets of the local dataset 232. It is noted that these datasets need not be the same size.

During the initial update round, the training dataset is used to train the local model 560 and then the updated model is sent to the server 570. For example, during the initial round, the local model 222 is trained using the training dataset 234. The resulting updated local model 222 is then sent to the server 210 or at least what the client node 220 believes is the server in the case where a client isolation attack has occurred.

Returning to the decision block 520, if the answer is yes that initialization of the local dataset has occurred, which may mean the current update round is subsequent to the initial update round, the method 500 moves to decision block 540.

At the decision block 540, it is determined if the received global machine-learning model is in an overfitted state or is trending towards overfitting. For example, the validation module 250 may use the validation dataset 236 to determine if the global model 212 is in the overfitted state or is trending towards overfitting in any of the ways previously described.

When it is determined that the global machine-learning model is in the overfitted state or is trending towards overfitting (yes at the decision block 540), the client node leaves the federation 550 as it is likely that the client node has been subjected to a client isolation attack. For example, the client node 220 may leave the federation by interrupting communication with the server 210.

When it is determined that the global machine-learning model is not in the overfitted state or is trending towards overfitting (no at the decision block 540), the training dataset is used to train the local model 560 and then the updated model is sent to the server 570. For example, the local model 222 is trained using the training dataset 234. The resulting updated local model 222 is then sent to the server 210. The method steps 510-570 may be repeated for any number of additional update rounds as needed as shown at 580.

E. Further Example Embodiments

Following are some further example embodiments of the invention. These are presented only by way of example and are not intended to limit the scope of the invention in any way.

Embodiment 1. A method, comprising: receiving at a client node of a federation a global machine-learning model that is to be trained by the client node using a training dataset that is local to the client node; in response to receiving the global machine-learning model, determining at the client node if the global machine-learning model is trending toward an overfitted state using a validation datasets, the validation dataset being a subset of data local to the client node that is not included in the training dataset, the overfitted state being indicative that the global machine-learning model has not been received from a server that is part of the federation because of a client isolation attack on the client node; in response to determining that the global machine-learning model is trending towards the overfitting state, causing the client node to leave the federation; and in response to determining that the global machine-learning model is not trending towards the overfitted state, training the global machine-learning model using the training dataset to thereby update the global machine-learning model.

Embodiment 2. The method of embodiment 1, further comprising: sending the updated global machine-learning model to the server.

Embodiment 3: The method of any of embodiments 1-3, wherein the global machine-learning model is received from a malicious party who has intercepted a process flow between the client node and the server during the client isolation attack.

Embodiment 4: The method of embodiment 3, wherein leaving the federation comprises causing the client node to interrupt communication with the server and/or the malicious party.

Embodiment 5: The method of any of embodiments 1-4, further comprising: generating the training dataset and the validation dataset prior to training the global machine-learning model.

Embodiment 6: The method of embodiment 5, wherein generating the training dataset and the validation dataset comprises splitting an overall dataset that is local to the client node into at least the training dataset and the validation dataset.

Embodiment 7: The method of any of embodiments 1-6, wherein determining if the global machine-learning model is trending toward an overfitted state using the validation dataset comprises: determining a training error when the global machine-learning model is trained using the training dataset; determining a validation error when the global machine-learning model is trained using the validation dataset; comparing the training error to a training error threshold; and comparing the validation error to a validation error threshold.

Embodiment 8: The method of any of embodiments 1-7, wherein it is indicative that the global machine-learning model is in the overfitted state when the training error is above the training error threshold and the validation error is below the validation error threshold.

Embodiment 9: The method of any of embodiments 1-7, wherein it is indicative that the global machine-learning model is received from the server when the training error is below the training error threshold and the validation error is below the validation error threshold.

Embodiment 10: The method of any of embodiments 1-7, wherein determining if the global machine-learning model is trending toward an overfitted state using the validation dataset comprises using the validation dataset as an input into a validation process that is configured to output a result indicating the overfitted state.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

Finally, because the principles described herein may be performed in the context of a computing system some introductory discussion of a computing system will be described with respect to FIG. 6. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
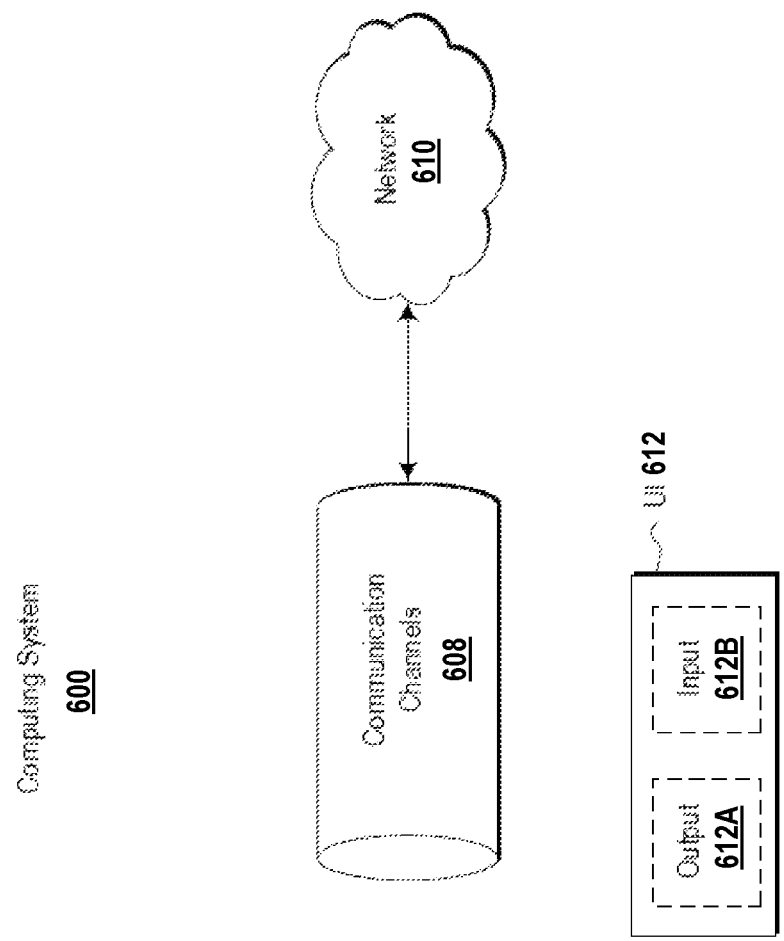
FIG. 6 illustrates an example computing system in which the embodiment described herein may be employed.
Figure 6:
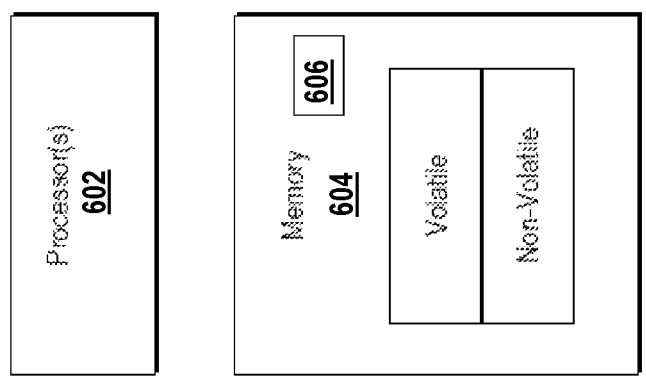

As illustrated in FIG. 6, in its most basic configuration, a computing system 600 typically includes at least one hardware processing unit 602 and memory 604. The processing unit 602 may include a general-purpose processor and may also include a field-programmable gate array (FPGA), an application-specific integrated circuit (ASIC), or any other specialized circuit. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 also has thereon multiple structures often referred to as an "executable component". For instance, memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, and so forth. Examples of input mechanisms 612B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 600 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 602 and memory 604, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving at a client node of a federation a global machine-learning model that is to be trained by the client node using a training dataset that is local to the client node;
    in response to receiving the global machine-learning model, determining at the client node if the global machine-learning model is trending toward an overfitted state using a validation dataset, the validation dataset being a subset of data local to the client node that is not included in the training dataset, the overfitted state being indicative that the global machine-learning model has not been received from a server that is part of the federation because of a client isolation attack on the client node, wherein determining if the global machine-learning model is trending toward an overfitted state using the validation dataset comprises:
        determining a training error when the global machine-learning model is trained using the training dataset;
        determining a validation error when the global machine-learning model is trained using the validation dataset;
        comparing the training error to a training error threshold; and
        comparing the validation error to a validation error threshold, and it is indicative that the global machine-learning model is in the overfitted state when the training error is above the training error threshold and the validation error is below the validation error threshold;
    in response to determining that the global machine-learning model is trending towards the overfitting state, causing the client node to leave the federation; and
    in response to determining that the global machine-learning model is not trending towards the overfitted state, training the global machine-learning model using the training dataset to thereby update the global machine-learning model.

2. The method of claim 1, further comprising:
    sending the updated global machine-learning model to the server.

3. The method of claim 1, wherein the global machine-learning model is received from a malicious party who has intercepted a process flow between the client node and the server during the client isolation attack.

4. The method of claim 3, wherein leaving the federation comprises causing the client node to interrupt communication with the server and/or the malicious party.

5. The method of claim 1, further comprising:
    generating the training dataset and the validation dataset prior to training the global machine-learning model.

6. The method of claim 5, wherein generating the training dataset and the validation dataset comprises splitting an overall dataset that is local to the client node into at least the training dataset and the validation dataset.

7. The method of claim 1, wherein it is indicative that the global machine-learning model is received from the server when the training error is below the training error threshold and the validation error is below the validation error threshold.

8. The method of claim 1, wherein determining if the global machine-learning model is trending toward an overfitted state using the validation dataset comprises:
    using the validation dataset as an input into a validation process that is configured to output a result indicating the overfitted state.

9. A non-transitory storage medium having stored therein instructions that are executable by one or more hardware processors to perform operations comprising:
    receiving at a client node of a federation a global machine-learning model that is to be trained by the client node using a training dataset that is local to the client node;
    in response to receiving the global machine-learning model, determining at the client node if the global machine-learning model is trending toward an overfitted state using a validation dataset, the validation dataset being a subset of data local to the client node that is not included in the training dataset, the overfitted state being indicative that the global machine-learning model has not been received from a server that is part of the federation because of a client isolation attack on the client node, wherein determining if the global machine-learning model is trending toward an overfitted state using the validation dataset comprises:
        determining a training error when the global machine-learning model is trained using the training dataset;
        determining a validation error when the global machine-learning model is trained using the validation dataset;
        comparing the training error to a training error threshold; and
        comparing the validation error to a validation error threshold, and it is indicative that the global machine-learning model is in the overfitted state when the training error is above the training error threshold and the validation error is below the validation error threshold;

in response to determining that the global machine-learning model is trending towards the overfitting state, causing the client node to leave the federation; and in response to determining that the global machine-learning model is not trending towards the overfitted state, training the global machine-learning model using the training dataset to thereby update the global machine-learning model.

10. The non-transitory storage medium of claim 9, further comprising the following operation:

sending the updated global machine-learning model to the server.

11. The non-transitory storage medium of claim 9, wherein the global machine-learning model is received from a malicious party who has intercepted a process flow between the client node and the server during the client isolation attack.

12. The non-transitory storage medium of claim 11, wherein leaving the federation comprises causing the client node to interrupt communication with the server and/or the malicious party.

13. The non-transitory storage medium of claim 9, further comprising the following operation:

generating the training dataset and the validation dataset prior to training the global machine-learning model.

14. The non-transitory storage medium of claim 13, wherein generating the training dataset and the validation dataset comprises splitting an overall dataset that is local to the client node into at least the training dataset and the validation dataset.

15. The non-transitory storage medium of claim 9, wherein it is indicative that the global machine-learning model is received from the server when the training error is below the training error threshold and the validation error is below the validation error threshold.

16. The non-transitory storage medium of claim 9, wherein determining if the global machine-learning model is trending toward an overfitted state using the validation dataset comprises:

using the validation dataset as an input into a validation process that is configured to output a result indicating the overfitted state.

* * * * *